United States Patent Office 3,511,244
Patented May 12, 1970

3,511,244
ALDEHYDE, ALUM, AND DIHYDROXYBENZOIC ACID TANNED COLLAGEN ARTICLES AND THEIR PRODUCTION
John Kurilla, Plainfield, N.J., assignor to Ethicon, Inc., a corporation of New Jersey
Continuation-in-part of application Ser. No. 284,049, May 29, 1963. This application Nov. 14, 1966, Ser. No. 593,869
Int. Cl. A61l 17/00
U.S. Cl. 128—335.5      2 Claims

ABSTRACT OF THE DISCLOSURE

An extruded collagen suture is tanned with formaldehyde, 2,4-dihydroxybenzoic acid and a soluble aluminum salt to produce a colorless tanned suture containing from about 0.2 to about 1% by weight of aluminum (as aluminum oxide). The resulting suture has the in vivo absorption characteristic of plain tanned catgut sutures.

---

Figure 1:
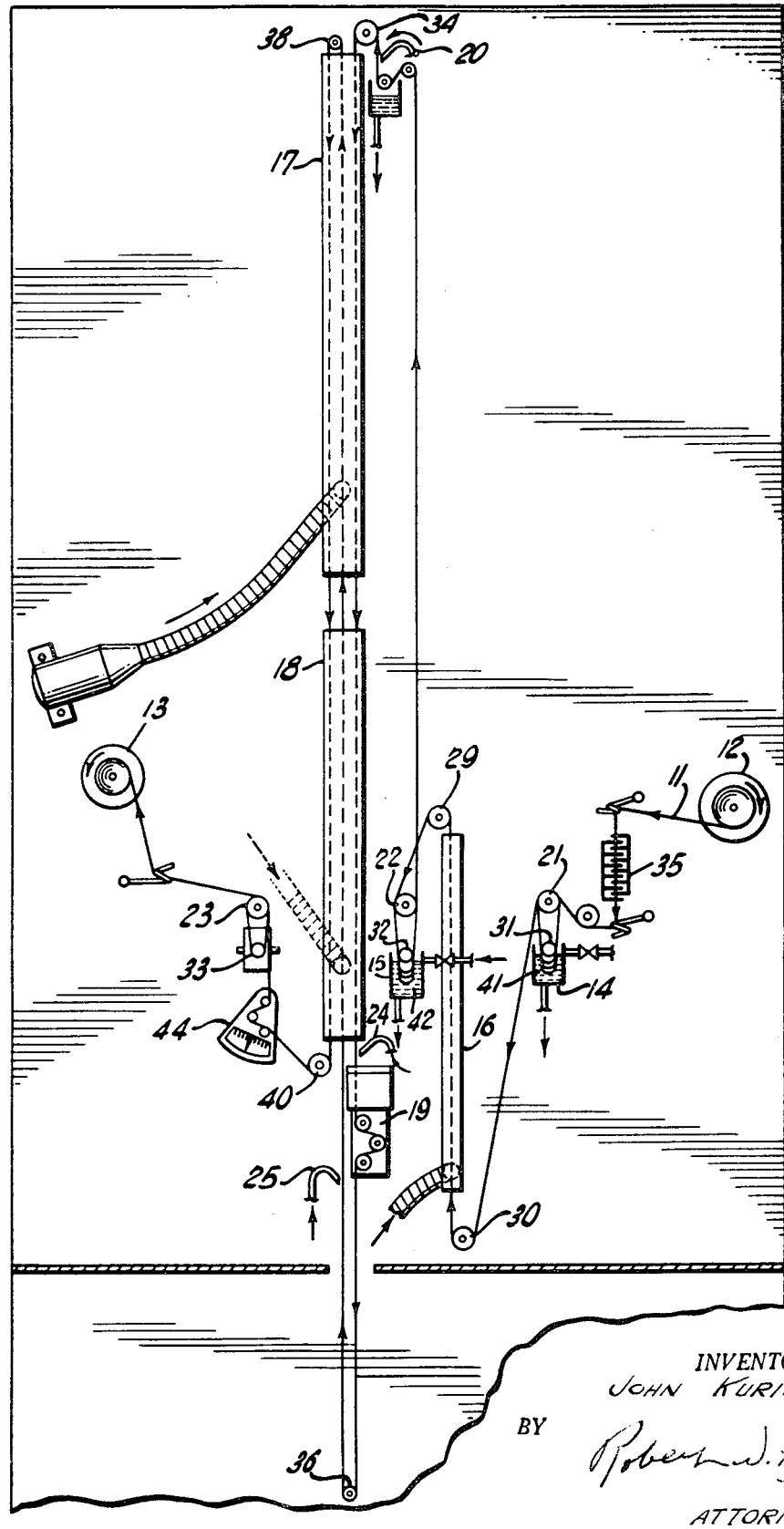

This application is a continuation-in-part of my co-pending application Ser. No. 284,049 filed May 29, 1963 now abandoned and is directed to the treatment of collagen and the product so obtained. The present invention relates to a method of chemically treating substantially pure collagen filaments and strands for surgical uses, such as, suturing and ligating.

In the surgical suture field, catgut which is obtained from sheep and beef intestines has been made available in two general forms: plain and chromic. Plain sutures are light in color, essentially chemically untreated, and are absorbed more rapidly than are chromic sutures. The latter have greater absorption time characteristics, since chromium is used expressly to extend absorption time. It is well known, however, that catgut sutures which have been implanted in the human body are slowly attacked by proteolytic enzymes with a resulting decrease in tensile strength and ultimate absorption.

A particular problem exists, however, in the case of extruded collagen strands. The latter have recently been developed, as described in such U.S. patents as 2,919,999 and 2,920,000, and are well adapted for treatment to form surgical sutures. In particular, it has been noted that collagen strands obtained by extruding a dispersion of collagen fibrils into a coagulating bath are characterized by a rapid in vivo digestion. Thus, a collagen suture prepared under conditions that involve swelling collagen fibrils in acid solution, extruding the swollen collagen fibrils to form a filament, and subsequently dehydrating the swollen collagen fibrils is more rapidly attacked by proteolytic enzymes than sutures prepared from sheep intestines.

As explained in U.S. Pat. Nos. 3,166,073 and 3,166,074, extruded collagen strands have been tanned to provide chromic sutures. This invention is concerned with treating of extruded collagen sutures such that they have the appearance (e.g., color) and absorption characteristics corresponding to plain catgut sutures. Thus, extruded collagen has now been used effectively as the basis for plain and chromic surgical sutures.

It is an object of the present invention, therefore, to chemically modify collagen and thereby increase its resistance to enzymatic degradation.

It is another object of the invention to provide a chemically treated collagen suture having a suitable wet tensile strength.

Still another object of the invention is to produce an extruded chemically treated absorbable collagen suture that will retain sufficient tensile strength under the conditions of use to accomplish its purpose and be absorbed in the body after the wound has healed when the suture is no longer necessary.

Another related object is to provide an extruded chemically treated absorbable collagen suture adapted for use with relatively fast healing wounds.

A further object is to provide chemically treated collagen suture of light color.

Other objects will be apparent from the following description.

The foregoing objects are realized by a method of treating a bonded collagen multifilament with a solution containing at least one member of each of the following components (a), (b), and (c):
  (a) An aldehyde,
  (b) An aluminum salt, and
  (c) A dihydroxybenzoic acid, namely, 1-carboxy-2,4-dihydroxybenzene, also known as beta-resorcylic acid

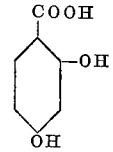

Alternatively, a multifilament can be treated intially with a solution containing components (a) and (b), and then with component (c). Another alternative involves treatment with a solution containing components (b) and (c), thence with a second solution containing component (a).

A solution of the dihydroxybenzoic acid, (c) above, if used alone, provides a collagen strand which has inadequate initial wet strength and which has an excessively rapid rate of in vivo tensile strength loss. However, when this treatment is followed by a second solution containing formaldehyde, the said rate is decreased. It is known that formaldehyde alone will increase the initial wet strength of collagen, but if formaldehyde alone is used in the amount required for adequate in vivo properties, the strand is embrittled and the knot strength is lowered. By treating the strand consecutively with the dihydroxybenzoic acid and a formaldehyde solution, the rate of tensile strength loss may be greatly improved without embrittling the strand. The use of a combination of the dihydroxybenzoic acid solution and formaldehyde solution, however, will not afford a suture having requisite initial wet strength nor a satisfactory rate of in vivo tensile strength loss.

The purpose of the aluminum salt in the tanning bath is to increase the initial wet tensile strength of the final strand. Aluminum alone has only a minor effect on the rate of tensile strength loss of the collagen at the concentration employed in the present invention.

Component (a), as indicated above, is an aldehyde. Mono- and di-aldehydes can be used herein. Typical of such components are formaldehyde, acetaldehyde, and other essentially water-soluble, homologous aldehydes, glyoxal, succindialdehyde, malonic dialdehyde, etc. However, in forming essentially colorless sutures a monoaldehyde is preferred. Particularly preferred is formaldehyde.

An aluminum salt is used in preparing the sutures contemplated herein. Typical of such salts are $$K_2Al_2(SO_4)_4 \cdot 16H_2O$$

(alum), basic aluminum acetate and alumino formo acetate $(Al(OH)(HCOO)(CH_3COO))$. The latter is preferred.

The invention will appear more clearly from the following detailed description when taken in connection with the accompanying drawings, which show by way of example, preferred embodiments of the inventive idea. Referring now to the drawings, FIG. 1 illustrates a machine designed to continuously tan a bonded collagen multifilament; and FIG. 2 illustrates a two-bath, horizontal system for processing a collagen tape in accordance with the present invention.

The starting material for the process of the present invention may be a bonded collagen multifilament or a collagen tape or ribbon. The bonded collagen multifilament is ribbon-like in form and is made up of from about 20 to about 500 individual collagen monofilaments. It may be prepared by extruding a dispersion of substantially pure swollen tendon collagen fibrils through a multi-orifice spinnerette into an alkaline acetone dehydrating bath. The multifilaments, as they emerge from the spin bath, are very loosely united and are approximately circular in cross-section; however, the filaments are drawn from the spin bath by a rotating godet, and the tension on the still wet filaments as they pass over the godet surface bonds the individual filaments together to form a ribbon-like strand. When the bonded multifilament is dried, the ribbon-like shape is retained. It will be understood from the foregoing that the individual filaments are bonded together by cohesive forces to form the collagen tape, as described in U.S. Pat. No. 3,114,372.

A collagen tape may also be prepared by extruding collagen fibrils onto a moving belt to form a collagen film and by repeating this process to build up a laminated film about 1 to 4 mils in thickness which may be slit to form the collagen tape (see application Ser. No. 593,894, filed Nov. 14, 1966).

Figure 2:
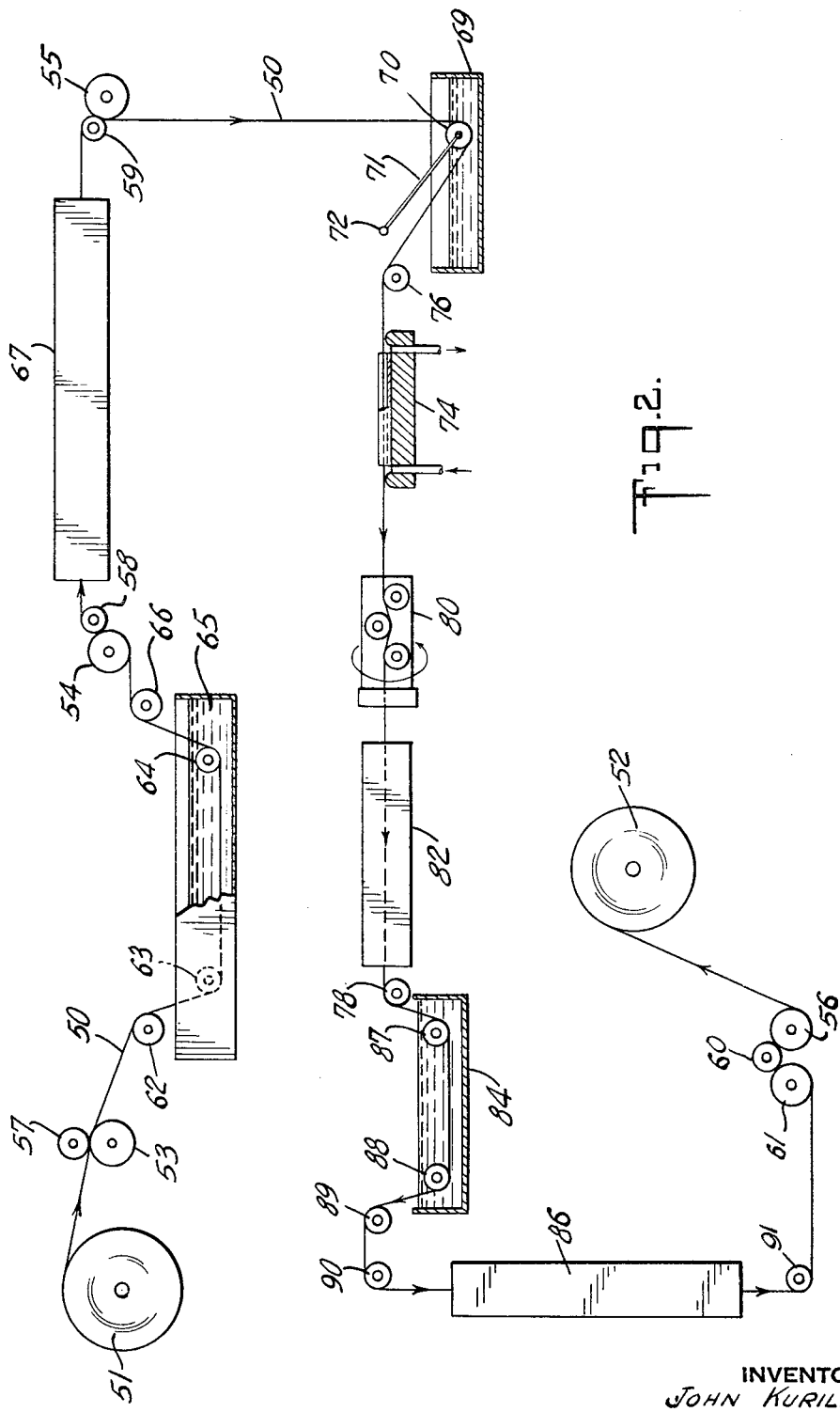

The mechanical handling of the collagen tape as it passes through the different tanning solutions and is dried and rounded to form a strand of circular cross-section is illustrated by FIGS. 1 and 2. The apparatus to be described is designed for the continuous treatment of collagen tape containing about 195 filaments and shaping the tanned multifilament to form a rounded strand about 14.5 mils in diameter, but it will be understood that strand of smaller or larger diameter may be produced by varying the size of the collagen tape or the number of individual filaments in the collagen tape and such modifications are well within the scope of this invention.

It will be noted from FIG. 1 that the collagen tape 11 is transferred from the supply reel 12 to the takeup spool 13 by the driven godets 21, 22, and 23. The tape is stretched between godet 21 and godet 22, and is stretched again between godets 22 and 23. Directly below each godet are auxiliary nylon rollers 31, 32, and 33. The rollers 31 and 32 are surrounded by trays 14 and 15 which may be filled with liquids 41 and 42 that are to be applied to the moving collagen strand. Other means of treating the moving collagen strand with liquids are provided by the jets 20, 24, and 25.

The tubes 16, 17, and 18 are heated and function to dry and warm the moving strand. The desired circular cross-section of the final product can be accomplished by means of a false twister 19 which operates to round and dry the strand as it moves through the drying tubes 17 and 18.

The three godets 21, 22, and 23 may be made of nylon and are driven by a Reeves variable speed gear reduction motor. Directly below godet 21 is an auxiliary nylon roller 31. The separation of the collagen tape on godet 21 is controlled by moving the axis of the auxiliary roller 31 with respect to the axis of the godet.

The godet 21 is driven at a speed of about 10 r.p.m. At 10 r.p.m., the linear rate of tanning is about 30 inches per minute. The collagen tape from a tensioning device 35 passes three times around godet 21, the three loops providing sufficient time in the bath 41 to wet out the collagen tape well with the tanning solution.

Godet 22 is driven at 11 r.p.m. and, therefore, produces a 10 percent stretch in the tape between godet 21 and godet 22. The amount of stretch in this stage may be increased or decreased by varying the relationship between the speeds of godet 21 and godet 22. It will be noted that the strand is wrapped around godet 22 three times. The stretching between godet 21 and godet 22 provides orientation of the drying collagen tape and improves the tensile strength.

If conditions are controlled so that the godet 21 is operated at 10 r.p.m., godet 22 is operated at 11 r.p.m., and godet 23 is operated at 12 r.p.m. One would obtain, in addition to the 10 percent stretch between godets 21 and 22, another 10 percent stretch between godets 22 and 23. The over-all stretch may be varied from about 10 percent to 20 percent; and, at the present time, the upper limit of stretch appears to be about 20 percent.

The moving collagen tape may be continously treated at godet 21 and godet 22. The solution 41 in the tray 14 is an aqueous solution of 2,4-dihydroxybenzoic acid present at a concentration of 0.2 percent to 2.0 percent. In addition to the said acid, the solution 41 can contain a small amount (about 0.05 percent) of a chelating agent, e.g., the disodium salt of ethylene diamine tetraacetic acid, to associate with any metal contaminants. A reducing agent, such as, sodium hydrosulfite or formaldehyde sodium sulfoxylate (marketed as Formopon), about 0.1 percent, can be used in the bath to deter oxidation.

The collagen tape passes from the tanning bath 41 around the idler pulley 30 and then through the drying tube 16. This drying tube has a cross-sectional area of about 2 to 3 square inches and is about 16 inches in length. Air, heated to about 150° F., is circulated through the tube 16 at the rate about 600 cubic feet per minute.

The dried collagen tape from the tube 16 passes over an idler pulley 29, is wrapped three times around godet 22, and is wet out in the second tanning bath 42. The bath 42 contains an aqueous solution of an aluminum salt and an aldehyde, such as, formaldehyde. The concentration of aluminum, as aluminum formoacetate, is about 0.5 to 2.5 percent; the concentration of formaldehyde is about 0.05 percent to about 0.4 percent; and the pH of the bath is about 2 to 4.7 percent (unbuffered). If the amount of aldehyde is greater than about 0.4 percent, the tensile strength of the strand drops and if the amount of aldehyde is less than about 0.05 percent, the in vivo adsorption of the strand will be rapid. In passing through this bath, the collagen tape absorbs about 0.6 percent by weight of aluminum, as aluminum oxide. It has been noted that the optimum wet tensile strength and dry knot strength of the finished strand is obtained when the amount of aluminum oxide in the strand is about 0.6 percent by weight. Collagen strands (size 2/0) containing less than 0.2 percent $Al_2O_3$ have a low wet knot strength, and strands containing more than about 1 percent $Al_2O_3$ have low dry knot strength.

The collagen tape passes from the bath 42 around the idler pulley 34 and through the drying tubes 17 and 18. These tubes have a cross-sectional area similar to that of the tube 16, but are longer, each tube being about 3 feet in length. As will be noted from FIG. 1, the tubes 17 and 18 are separated by about 6 inches. Air, heated to about 110° to 130° F. is circulated through the tube 17 at about 300 cubic feet per minute, and air-heated to about 155° F. is circulated through the tube 18 at about 450–600 cubic feet per minute.

The collagen tape from the bath 42 is rounded and shaped by contact with a false twister 19. The twisting cycle is most effective when the collagen tape is in the wet state, and this may be controlled by dripping water on the tape from the jet 20. The strand may also be lubricated just prior to contact with the false twister with distilled water which is added through the jet 24. When the twist backs up to the pulley 34, as the wet tape emerges from it, a gradual tapering effect of the strand takes place, which rounds it out. The circular shape of the strand remains after the twist is cancelled. The false twister is operated in the range of 150 to 1,000 r.p.m.

It is important that the water added through the jet 20 and the velocity and temperature of the air in the drying tubes 17 and 18 be controlled so that the wet tanned tape is sufficiently dry when the strand contacts the false twister 19 to avoid deformation. This results in an improved circular cross-section.

The round collagen strand passes from the false twister 19 around the idler pulley 36 and contacts a solution from the jet 25 flowing downwardly in a direction in which the collagen strand is moving. The solution from jet 25 is an aqueous solution of from about 0.08 percent to about 0.3 percent formaldehyde adjusted to a pH of about 9. If the concentration of formaldehyde is less than about 0.08 percent or if the tanning at jet 25 is eliminated entirely, the finished collagen strand will be absorbed more quickly when implanted in body tissues. If the concentration of formaldehyde is greater than about 0.3 percent, the finished collagen strand will be brittle and have poor dry knot strength.

The wetted out strand from the jet 25 passes through the drying tubes 18 and 17 around the idler pulley 38 and returns through the drying tubes 17 and 18 around idler pulley 40. When the godet 23 is operated at 12 r.p.m. to produce about 10 percent stretch between godet 22 and godet 23, the tension on the finished strand as measured by the tensiometer 44 is about 1,500 grams. The dry, tanned, and rounded strand is removed from the godet 23 by the take-up spool 13 at about 36 inches per minute. The final strand, under the operating conditions described above, has a diameter of about 14.5 mils (sutures size 2/0).

Referring now to FIG. 2 which illustrates the preferred method of practicing the present invention, collagen tape 50 is transferred from the supply reel 51 to the take-up spool 52 by the driven godets 53, 54, 55, 56, and 61. The idler rollers 57, 58, 59, and 60 frictionally grip the moving tape or strand and permit stretching thereof.

The collagen tape 50 passes from the driven godet 53 over the guide pulley 62 and around the idler pulleys 63 and 64 immersed in the tanning bath 65. The tanned tape is then guided out of the tanning bath by the idler pulley 66 and is stretched about 5 percent between the godets 53 and 54.

From the godet 54, the tape 50 passes through a drying chamber 67 where it is dried in a current of air, the temperature of which may vary from room temperature to about 130° F. and stretched another 2 percent. The tanned and dried strand then passes through a formaldehyde solution in the tray 69. The time that the moving strand is in contact with this solution may be varied by moving the idler wheel 70 at the end of extension arm 71 about the pivot 72. The moving strand is wet out with water flowing counter current to the movement of the strand through a split tube 74 and is twisted between idler pulley 76 and 78 by the false twister 80. The twisting cycle is most effective when the collagen tape is in the wet state, and this is controlled by the flow of water along the split tube 74. When the twist backs up to the pulley 76 as the wet tape emerges from it, a gradual tapering effect on the strand takes place, and the tape is rounded out. The circular shape of the strand remains after the twist is cancelled. The false twister is operated in the range of 150 to 600 r.p.m., and the strand is stretched about 6 percent between the godets 55 and 56. The idler pulley 78 guides the rounded strand from the false twister through the drying chamber 82 where excess moisture is removed from the strand.

The rounded and dried strand is preferably treated with an emulsion of castor oil in the tray 84 and dried in the chamber 86 prior to being collected on the take-up drum 52. Idler pulleys 87, 88, 89, 90, and 91 guide the castor oil treated strand through the tray 84 and chamber 86. The drying chamber 82 and 86 are heated to about 75° to 130° F.

In tanning bath 65, all of the components (a), (b), and (c) may be present. By way of illustration in preparing a substantially colorless suture, the bath can comprise formaldehyde, aluminum formo acetate, and 2,4-dihydroxybenzoic acid. The concentration of formaldehyde in the bath 65 can be varied to compensate for the time collagen is in contact with the bath. The tensile strength of the finished collagen suture decreases when the concentration of formaldehyde in bath 65 exceeds 0.6 percent, and the in vivo absorption of the suture is quite rapid if the formaldehyde concentration is less than about 0.05 percent.

Relative to the amount of aluminum in tanning bath 65, if the treated collagen strand contains less than about 0.2 percent of aluminum calculated as the corresponding oxide, low dry tensile strength results. Strands containing more than about 1 percent aluminum oxide have poor dry and wet knot strength. Therefore, the concentration of aluminum in the tanning bath can be adjusted within limits so that the collagen, in passing through the bath 65, will absorb about 0.4 percent by weight of aluminum as aluminum oxide. Generally, the concentration of aluminum in the bath will range from about 0.6 to about 1.2 percent by weight (as $Al_2O_3$).

Correspondingly, the concentration of 2,4-dihydroxybenzoic acid, (c), in tanning bath 65 is from about 0.2 percent to about 2 percent. The concentration of component (c) in the bath is so regulated that the collagen strand will absorb from about 0.5 to about 4 percent by weight thereof. Methanol is used to dissolve the 2,4-dihydroxybenzoic acid.

Other materials which can be used in the single tanning bath 65 include sodium hydrosulfite or like reducing agents. A strong reducing agent, such as, formaldehyde sodium sulfoxylate, marketed as Formopon) can be used in the bath to prevent oxidation of the acid. A small amount, about 0.5 percent by weight, of a chelating agent, such as, the disodium salt of ethylene diamine tetraacetic acid, can be used to associate with any undesirable contaminating metals present in the bath. Citric acid, in a concentration of about 0.5–5 percent by weight, can be used to prevent discoloration due to iron contamination.

The pH of the tanning bath should be between about 2.8 and about 4.5. If the pH is below about 2.8, the collagen will hydrate excessively and is likely to break. If the pH of the bath is above about 4.5, the metal salts present in the bath tend to precipitate. It is desirable, therefore, to adjust the pH of bath 65 within the above-mentioned limits. Excellent results have been obtained when the pH of the tanning bath 65 is between about 2.8 and 4.0.

It has been observed that atmospheric humidity, a variable during the spinning of a strand, plays an important part in the stretch and the final tensile strength of the strand. The humidity is preferably controlled by encasing the spinning operation within the smallest practical enclosure into which the air of controlled humidity may be introduced. Superior uniform strands may be obtained when the relative humidity is maintained at about 40 percent.

The continuous processing of collagen tape to obtain a unitary strand of outstanding properties is illustrated by the following examples. Throughout the specification, all quantities are expressed in parts by weight unless otherwise indicated.

EXAMPLE 1

A collagen tape approximately 4 mils thick and 60 mils wide containing individual filaments is processed on the apparatus illustrated above in connection with FIG. 1. The speed of each of the godets 21, 22, and 23 is maintained at 7, 7.7, and 8.3 r.p.m., respectively.

The following solutions are used.

Solution 41 at godet 21:

| | Parts |
|---|---|
| 2,4-dihydroxybenzoic acid | 1 |
| Deionized water | 98.9 |
| Sodium hydrosulfite | 0.1 |

Mixture adjusted to pH 8.0 with ammonium hydroxide.

tape that is immersed at any one time in the bath 65 is 60 inches and the rate of travel through the bath is 40 inches per minute. The finished, rounded collagen strand from the drying chamber 82 is not treated with the castor oil emulsion in tray 84 but is collected directly on the take-up drum 52. The finished strand contains:

| | Percent |
|---|---|
| Aluminum (as $Al_2O_3$) | 0.5 |
| 1-carboxy-2,4-dihydroxybenzene | 2.0 |

Results obtained in this illustration, and in comparable illustrations, are given below in Table II.

TABLE I.—TWO BATH TREATMENT

| | Bath 1 | | | Bath 2 | | | Tensile strength, lbs. | | | In vivo, lbs. | |
|---|---|---|---|---|---|---|---|---|---|---|---|
| Example No. | Percent Acid [1] | Percent $Na_2S_2O_4$ | pH | Percent A.F.A.[2] | Percent $CH_2O$ | pH | D.S. | D.K. | W.K. | 3 days | 7 days |
| 1 | 1.0 | 0.1 | 8.0 | 1.0 | 0.25 | 4.3 | 9.5 | 5.6 | 3.2 | 3.3 | 2.8 |
| 2 | 1.0 | 0.1 | 8.0 | 1.0 | 0.25 | 4.5 | 8.8 | 5.6 | 3.2 | 3.8 | 2.7 |

[1] 2,4-dihydroxybenzoic acid. [2] Aluminum formo acetate.

Solution 42 at godet 22:

| | Parts |
|---|---|
| Aluminum formoacetate | 1 |
| Formaldehyde | 0.25 |
| Water | 98.95 |

Mixture adjusted to pH 4.3 with sodium hydroxide.

Solution dripped on strand from jet 25:

| | |
|---|---|
| Formaldehyde | 0.3 |
| Deionized water | 99.7 |

Mixture adjusted to pH 8.0 with sodium hydroxide.

The tape was wrapped six times around godet 21, five times at godet 22, and nine times around godet 23.

Analysis of the tanned tape reveals that it contains:

| | Percent |
|---|---|
| Aluminum (as $Al_2O_3$) | 0.88 |
| 2,4-dihydroxybenzoic acid | 0.60 |
| Formaldehyde | 0.04 |

Results of this example are given in Table I above together with results of comparable illustration.

EXAMPLE 6

Collagen tape is tanned by the process illustrated in FIG 2. The bath 65 is an aqueous solution containing 1.0 percent beta resorcylic acid, 0.75 percent aluminum formoacetate, 0.5 percent sodium formaldehyde sulfoxylate, 0.05 percent disodium ethylene diamine tetraacetic acid and 10 percent methanol. The pH of this solution is 3.7. The bath in the tray 69 is an aqueous solution containing 0.3 percent formaldehyde and 1.5 percent sodium carboxymethyl cellulose. The collagen strand is wet out with water in the split tube 74 prior to contacting the false twister, and the tray 84 contains an emulsion of 0.3 percent castor oil in an aqueous solution of 3 percent sodium acetate and 0.03 percent gelatin. The finished collagen strand is removed from the take-up drum and is heated in an oven to a temperature of about 125° C. over a period of about 10 hours.

The process average in vivo absorption characteristics of two production batches of material prepared in accordance with this example are given below in Table III.

TABLE II.—SINGLE BATH TREATMENT

| | Tanning conditions | | | | | Tensile strength, lbs. | | | In vivo, lbs. | |
|---|---|---|---|---|---|---|---|---|---|---|
| Example No. | Percent acid [1] | Percent $CH_2O$ | Percent A.F.A.[2] | Percent MeOH | pH | D.S. | D.K. | W.K. | 3 days | 7 days |
| 3 | 1.5 | 1.0 | 1.0 | 10 | 4.0 | 9.6 | 5.9 | 3.5 | 3.5 | 2.9 |
| 4 | 0.8 | 0.64 | 0.25 | 3 | 3.7 | 10.0 | 5.7 | 3.5 | 4.2 | 3.7 |
| 5 | 1.0 | 0.7 | 1.0 | 3 | 3.7 | 10.0 | 5.8 | 3.4 | 4.6 | 3.3 |

[1] 2,4-dihydroxybenzoic acid. [2] Aluminum formo acetate.

Rats were used as the test animal in determining the absorption characteristics summarized in Table III. Each

TABLE III.—TWO BATH TREATMENT

| Production runs | Days post implantation | | | | | | | | | |
|---|---|---|---|---|---|---|---|---|---|---|
| | 1 | 3 | 5 | 7 | 10 | 14 | 28 | 56 | 84 | 120 |
| Example 6, size 3/0 W7-1287 and W7-1288, amount that remains unabsorbed, percent | | | 99 | | | 95 | | 62 | 26 | |
| Chrome tanned, size 3/0 W1-1405 and W1-1180, amount that remains unabsorbed, percent | | | 99 | | | 98 | | 77 | 56 | 49 | 17 |
| Example 6, size 3/0 W7-1287 and W7-1288, pounds of tensile strength | 2.6 | | 1.4 | | 0.25 | 0.1 | | | | |
| Chrome tanned, size 3/0 W1-1405 and W1-1180, pounds of tensile strength | 4.0 | | 2.2 | | 1.6 | 1.1 | | | | |

EXAMPLE 3

A tanning solution is prepared by dissolving 1.5 parts of the dihydroxybenzoic acid in 10 parts of methanol, 1 part of formaldehyde, and 1 part of aluminum formoacetate and 86.5 parts of water. The pH of this solution is adjusted to 4.0 by the addition of 10 normal sodium hydroxide solution.

The final analysis of the tanning solution is:

| | Percent |
|---|---|
| Aluminum (as $Al_2O_3$) | 0.98 |
| 1-carboxy-2,4-dihydroxybenzene | 1.45 |
| Formaldehyde | 0.97 |

This tanning bath is used to treat a collagen tape approximately 4 mils thick and 60 mils wide containing 192 individual filaments as illustrated in FIG. 2. The length of value is the average of 50 tests (subcutaneous implantation) in 10 animals (5 implantations in each animal).

EXAMPLE 7

Sutures prepared according to the method of the present invention contain 2,4-dihydroxybenzoic acid chemically combined with the collagen. A quantitative determination of the amount of said substituted benzene that is present in the finished suture can be made by the following method.

A 10-milligram sample of suture tanned with 2,4-dihydroxybenzoic acid is placed in a test tube and 1 milliliter of sodium borohydride solution is added. The solution of sodium borohydride is prepared by dissolving 0.60 gram of sodium borohydride in 20 milliliters of distilled water and adding one pellet of sodium hydroxide. This solution is prepared fresh for each group of samples. The test tube containing the suture to be analyzed and borohydride solution is heated over a Bunsen flame until the suture is dissolved. The contents of the test tube are then neutralized with concentrated sulfuric acid and the test tube is heated to decompose any excess sodium borohydride solution. The reaction mixture so obtained is cooled and diluted to 3 milliliters with distilled water. One milliliter of a vanillin reagent, prepared by dissolving 7.5 grams of vanillin in 50 milliliters of ethyl alcohol, is added and the mixture is diluted with 79 percent sulfuric acid to 23 milliliters. After 20 minutes, the absorbence at 520 mu is compared with a reagent blank using a Beckman D.U. spectrophotometer and four standards containing 0.01, 0.02, 0.03, and 0.04 milliliter of a 2,4-dihydroxybenzoic acid standard solution prepared by dissolving 0.130 gram of 2,4-dihydroxybenzoic acid in 4 N sulfuric acid to a total volume of 100 milliliters.

The absorbence values are plotted against the milligrams of 2,4-dihydroxybenzoic acid in the standard, and the percent of 2,4-dihydroxybenzoic acid in the sample is calculated according to the formula $$\frac{K \times A \times 100}{\text{Sample weight (mg.)}}$$

in which A is the absorbence obtained from the curve and K, for the 0.04 milliliter standard, is 0.052 milligram of 2,4-dihydroxybenzoic acid divided by A from the curve.

The visible wave length values at which maximum absorption occurs with 2,4-dihydroxybenzoic acid are 241, 257 and 277 mu.

I have found that sutures prepared by the method of the present invention contain about 0.5 to about 4 percent, and preferably from about 1.8 to about 2.5 percent, 2,4-dihydroxybenzoic acid as determined by the foregoing analytical method.

Sutures described herein can be stored in a variety of tubing fluids, including alcoholic solutions and basic alcoholic solutions of sodium nitrite. Sutures tanned in accordance with the present invention contain from about 0.2 percent to about 1 percent by weight aluminum (aluminum oxide).

It will be understood that the process described above may be utilized in the preservation of other collagenous materials, such as, leather; the useful life of which is frequently shortened by the attack of micro-organisms and enzymes produced by such micro-organisms.

While the invention has been described in detail according to the preferred method of carrying out the process and yielding the products, it will be obvious to those skilled in the art that changes and modifications can be made without departing from the spirit or scope of the invention, and it is intended in the appended claims to cover such changes and modifications.

What is claimed is:

1. A substantially colorless tanned collagen suture comprising a multiplicity of multifilaments consisting essentially of collagen fibrils having throughout their entire length, in the monofilaments as in their natural state, typical banding at intervals of approximately 640 Angstrom units and rectilinearity; substantially all of said fibrils having an alignment parallel to the longitudinal axis of the monofilament which contains them; said monofilaments being bonded to each other along their longitudinal surfaces to form a unitary linear structure, and disposed in parallel contiguity with respect to each other; and said unitary structure having a longitudinal axis in substantial parallelism with the longitudinal axis of the various monofilaments therein;

said tanned suture containing from about 0.5 percent to about 4 percent by weight of 2,4-dihydroxybenzoic acid and from about 0.2 percent to about 1 percent by weight of aluminum (as aluminum oxide).

2. A substantially colorless tanned collagen suture comprising a laminated collagen tape of uniform width and thickness; said tape being convoluted about its longitudinal axis with each convolution bonded with its adjacent convolutions; said tape being impregnated substantially uniformly throughout with from about 0.5 percent to about 4 percent by weight of 2,4-dihydroxybenzoic acid and from about 0.2 percent to about 1 percent by weight of aluminum (as aluminum oxide).

References Cited

UNITED STATES PATENTS

| 987,750 | 3/1911 | Seyewitz | 8—94.33 |
| 3,166,073 | 1/1965 | Kronenthal | 128—335.5 |
| 3,166,074 | 1/1965 | Kurilla | 128—335.5 |

OTHER REFERENCES

Gustavson: Chemistry and Reactivity of Collagen, 1956, pp. 295–301, 232–233.

Gortner: Outline of Biochemistry, 1949, pp. 754–755, 758–759.

DALTON L. TRULUCK, Primary Examiner

J. D. YASKO, Assistant Examiner

U.S. Cl. X.R.

8—94.33